United States Patent
Huang et al.

(10) Patent No.: US 7,990,854 B1
(45) Date of Patent: Aug. 2, 2011

(54) ISOLATION OF TRAFFIC COMPOSITION CHANGE IN PERFORMANCE METRICS

(75) Inventors: Yan Huang, Kenmore, WA (US); Bahman Rabii, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/130,385

(22) Filed: May 30, 2008

(51) Int. Cl.
*H04L 12/26* (2006.01)
*H04J 3/14* (2006.01)

(52) U.S. Cl. ......... 370/229; 370/252; 370/254; 709/224

(58) Field of Classification Search .................. 709/224; 370/252, 241
See application file for complete search history.

(56) References Cited

U.S. PATENT DOCUMENTS

| | | |
|---|---|---|
| 2008/0189408 A1 * | 8/2008 | Cancel et al. ................. 709/224 |
| 2008/0250050 A1 * | 10/2008 | Cracchiolo et al. ........... 707/102 |

\* cited by examiner

*Primary Examiner* — Chi H Pham
*Assistant Examiner* — Ahmed Elallam
(74) *Attorney, Agent, or Firm* — Fish & Richardson P.C.

(57) ABSTRACT

Apparatus, systems and methods for isolation of traffic composition in performance metrics are disclosed. A change in a performance metric of a content provisioning system is determined. The change in the performance metric is compared to a weighted change expected from the content provisioning system if traffic was not a factor. A traffic independent change is determined from the weighted change. A traffic related change is determined.

22 Claims, 4 Drawing Sheets

ISOLATION OF TRAFFIC COMPOSITION CHANGE IN PERFORMANCE METRICS

BACKGROUND

This document relates to information presentation.

The performance of a content provisioning system, such as an advertisement provision system, is influenced by a variety of factors, including for example targeting quality, page views by user per day, economic conditions, average ad campaign quality, advertiser budget constraints, and types of publishers in the network. To increase performance, providers of a content provisioning system may change one or more quality performance requirements, such as quality measures, bid requirements, etc. Such changes, however, are predicated on expected performance increases; the true effect of these changes are verified after they are implemented by measuring system performance over a performance monitoring period. If after a performance monitoring period the changes are determined to increase performance, the changes can be permanently implemented. However, if the changes are determined to unexpectedly decrease performance, they can be removed to restore the system performance to the pre-change levels.

Performance of a content provisioning system, however, also depends on traffic composition factors, i.e., the percentage of traffic directed to particular web sites, domains, an other identifiable publishing providers. These traffic composition factors can be independent of other performance metrics. For example, on any given day, the relative traffic between two different websites can vary significantly. Conversely, the performance of each web site may be highly dependent on the performance requirements of the content provisioning system. Thus, if the traffic composition factors of the content provisioning system before a performance monitoring period are different from during the performance monitoring period, the effects of the changes of the performance requirements may be highly influenced by the traffic composition change in the network. This traffic influence can make it very difficult to measure the true effect imparted by the changes in the performance requirements.

SUMMARY

In general, one aspect of the subject matter disclosed in this specification can be embodied in a method for isolation of traffic composition change in performance metrics. The method includes determining an overall change in a performance metric of a content provisioning system that provides content to a plurality of content publishers, the overall change in the performance metric quantifying a change in performance from a first time period to a second time period; for each of the content publishers, determining a reference traffic value common to both the first time period and the second time period; determining a reference traffic change in the performance metric of the content provisioning system based on the reference traffic values for each of the publishers, the reference traffic change quantifying a traffic-independent change in performance from the first time period to the second time period; and determining a traffic related change in the performance metric of the content provisioning system based on the reference traffic change and the overall change.

In another aspect, another method for isolation of traffic composition change in performance metrics includes determining a first performance metric value for a first time period, the first performance metric value quantifying an attribute during the first time period; determining a second performance metric value for a second time period, the second performance metric value quantifying the attribute for the second time period; determining a performance change for the attribute based on the difference between the first performance metric value and the second performance metric value; determining a first weighted performance metric value for the first time period; determining a second weighted performance metric value for the second time period; determining a weighted performance change for the attribute based on the difference between the first weighted performance metric value and the second weighted performance metric value; and determining a traffic related change on the attribute based on the performance change and the weighted performance change.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
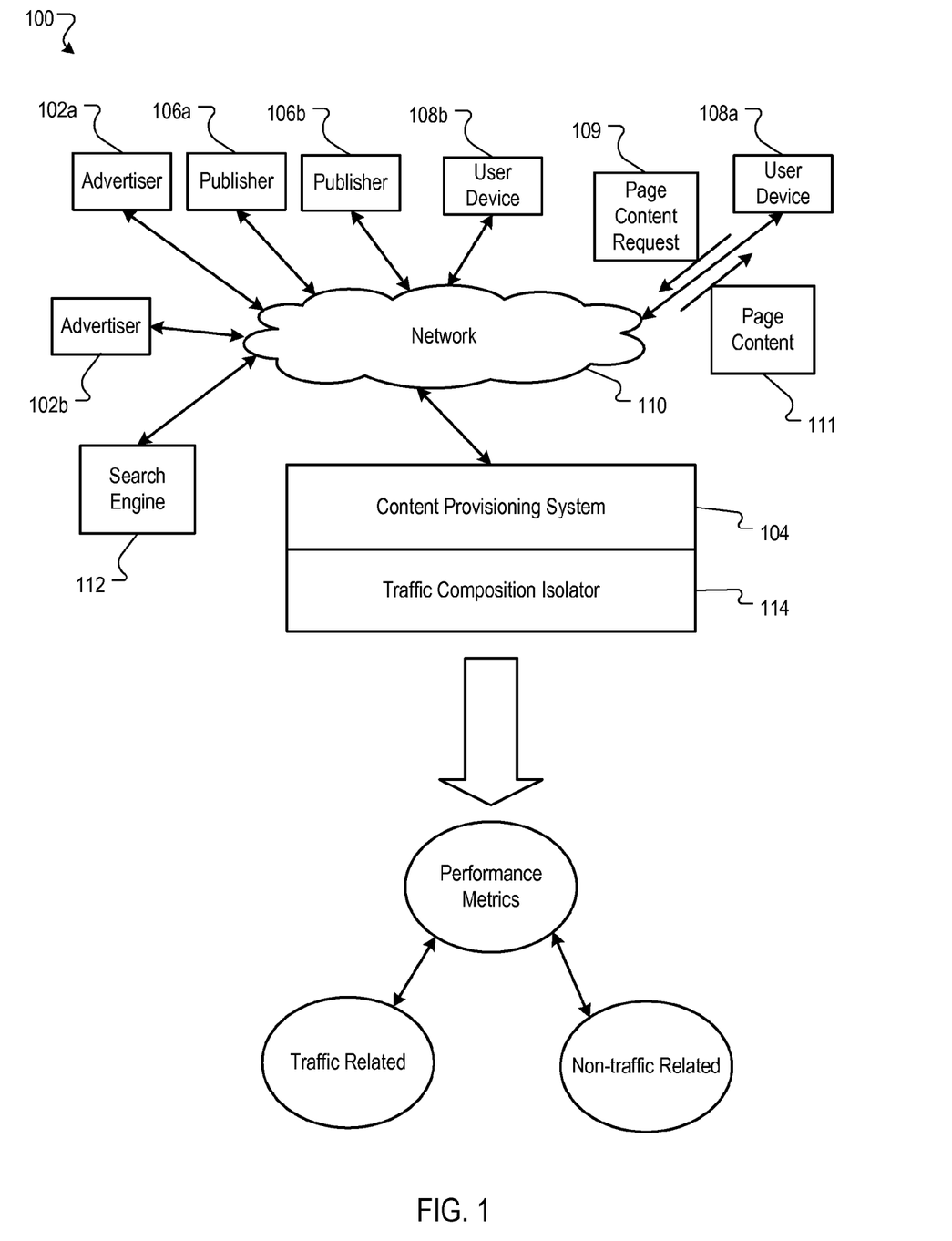
FIG. 1 is a block diagram of an example online environment.

FIG. 1 is a block diagram of an example online environment 100. The online environment 100 can facilitate the identification and serving of content items, e.g., web pages, advertisements, etc., to users. A computer network 110, such as a local area network (LAN), wide area network (WAN), the Internet, or a combination thereof, connects advertisers 102a and 102b, a content provisioning system 104, publishers 106a and 106b, user devices 108a and 108b, and a search engine 112. Although only two advertisers (102a and 102b), two publishers (102a and 102b) and two user devices (108a and 108b) are shown, the online environment 100 may include many any number (e.g., thousands) of advertisers, publishers and user devices.

§1.0 Content Provisioning System

The example content provisioning system 104 of FIG. 1 is an advertising provisioning system. While the examples described in this specification relate to advertisements, the isolation of traffic composition effects can also be facilitated for other types of content provisioning systems, such as user-contributed video provisioning systems, audio/music provisioning systems, general document provisioning systems (e.g., blogs, news, entertainment related documents), and the like.

In some implementations, one or more advertisers 102a and/or 102b can directly, or indirectly, enter, maintain, and track advertisement information in the content provisioning system 104. The advertisements can be in the form of graphical advertisements, such as banner advertisements, text only advertisements, image advertisements, audio advertisements, video advertisements, advertisement gadgets with or without interactive features, advertisements combining one of more of any of such components, etc., or any other type of electronic advertisement document 120. The advertisements may also include embedded information, such as a links, meta-information, and/or machine executable instructions, such as HTML or JavaScript™. An advertisement can be submitted, for example, as a single ad creative, in a group of related advertisements as an ad group, or in multiple ad groups that form an ad campaign.

A user device, such as user device 108*a*, can submit a page content request 109 to a publisher or the search engine 112. In some implementations, the page content 111 can be provided to the user device 108*a* in response to the request 109. The page content can include advertisements provided by the content provisioning system 104, or can include executable instructions, e.g., JavaScript™ instructions, that can be executed at the user device 108*a* to request advertisements from the content provisioning system 104. Example user devices 108 include personal computers, mobile communication devices, television set-top boxes, etc.

Advertisements can also be provided for the publishers 106. For example, one or more publishers 106*a* and/or 106*b* can submit advertisement requests for one or more advertisements to the content provisioning system 104. The content provisioning system 104 responds by sending the advertisements to the requesting publisher 106*a* or 106*b* for placement on one or more of the publisher's web properties (e.g., websites and other network-distributed content). Alternatively, the content provisioning system 104 responds by sending the advertisement directly to the user device 108*a* in response to a user device request for page content 111 from the one or more publishers 106*a* and/or 106*b*, typically via instructions embedded in the page content 111 received by the user device 108*a* from the publishers 106*a* and/or 106*b*.

The advertisements can include embedded links to landing pages, e.g., pages on the advertisers' 102 websites, that a user is directed to when the user clicks an ad presented on a publisher website. The advertisement requests can also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, a publisher 106 can combine the requested content with one or more of the advertisements provided by the system 104. This combined page content 109 and advertisements can be sent to the user device 108 that requested the content (e.g., user device 108*a*) as page content 111 for presentation in a viewer (e.g., a web browser or other content display system). The publisher 106 can transmit information about the advertisements back to the content provisioning system 104, including information describing how, when, and/or where the advertisements are to be rendered (e.g., in HTML or JavaScript™).

Publishers 106*a* and 106*b* can include general content servers that receive requests for content (e.g., articles, discussion threads, audio, video, graphics, search results, web page listings, games, software, information feeds, etc.), and retrieve the requested content in response to the request. For example, content servers related to news content providers, retailers, independent blogs, social network sites, or any other entity that provides content over the network 110 can be a publisher.

Advertisements can also be provided through the use of the search engine 112. The search engine 112 can receive queries for search results. In response, the search engine 112 can retrieve relevant search results from an index of documents (e.g., from an index of web pages). An exemplary search engine 112 is described in S. Brim and L. Page, "The Anatomy of a Large-Scale Hypertextual Search Engine," Seventh International World Wide Web Conference, Brisbane, Australia (1998) and in U.S. Pat. No. 6,285,999. Search results can include, for example, lists of web page titles, snippets of text extracted from those web pages, and hypertext links to those web pages, and may be grouped into a predetermined number of (e.g., ten) search results.

The search engine 112 can also submit a request for advertisements to the system 104. The request may include a number of advertisements desired. This number may depend on the search results, the amount of screen or page space occupied by the search results, the size and shape of the advertisements, etc. The request for advertisements may also include the query (as entered, parsed, or expanded), information based on the query (such as geo-location information, whether the query came from an affiliate and an identifier of such an affiliate), and/or information associated with, or based on, the search results. Such information may include, for example, identifiers related to the search results (e.g., document identifiers), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search engine 112 can combine the search results with one or more of the advertisements provided by the system 104. This combined information can then be forwarded to the user device 108 that requested the content as the page content 111. The search results can be maintained as distinct from the advertisements, so as not to confuse the user between paid advertisements and search results.

§2.0 Performance of Content Served by a Content Provisioning System

The advertisers 102, user devices 108, and/or the search engine 112 can also provide usage information to the content provisioning system 104. This usage information can include measured or observed user behavior related to advertisements that have been served, such as, for example, whether or not a conversion or a selection related to an advertisement has occurred. The system 104 performs financial transactions, such as crediting the publishers 106 and charging the advertisers 102 based on the usage information. Such usage information can also be processed to measure performance metrics, such as a click-through rate ("CTR"), conversion rate, revenue per thousand impressions ("RPM"), etc.

A click-through can occur, for example, when a user of a user device, selects or "clicks" on a link to a content item returned by the publisher or the advertising management system. The CTR is a performance metric that is obtained by dividing the number of users that clicked on the content item, e.g., a link to a landing page, an advertisement, or a search result, by the number of times the content item was delivered. For example, if a link to a content item is delivered 100 times, and three persons click on the content item, then the CTR for that content item is 3%. Other usage information and/or performance metrics can also be used.

A "conversion" can occur when a user consummates a transaction related to a previously served advertisement. What constitutes a conversion may vary from case to case and can be determined in a variety of ways. For example, a conversion may occur when a user clicks on an advertisement, is referred to the advertiser's web page, and consummates a purchase there before leaving that web page. A conversion can also be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Other actions that constitute a conversion can also be used.

The RPM can be used to measure the revenue created when a conversion occurs, or other action on a content item results in a revenue generation. In some implementations, the RPM measures the revenue generated from one thousand impressions of an advertisement. For example, if an advertisement that is served 2,000 times generates $2 in revenue, the advertisement has an RPM of $1.00. In some implementations, the RPM is a metric that can be used to measure the effectiveness of the advertisement. Other metrics that measure the performance of an advertisement can also be used, such as the CTR or the conversion rate, for example.

§3.0 Identification of Change in Performance of Content Provisioning System

Performance metrics such as CTR, conversion rate and RPM are used to evaluate performance of content served by a content provisioning system, e.g. system 104. These metrics can be aggregated over a time period to measure the performance of the system 104. Various factors influence these performance metrics, including targeting quality, page view per user day, economic conditions, average ad campaign quality, advertiser budget constraints, types of publishers in the network, etc. For example, the performance metric RPM can measures the revenues generated per thousand impressions served by the content provisioning system 104 during a time period. The RPM can change from time period to time period; however, it is not apparent how much of the RPM change from one period to the next period can be attributed to changes in traffic patterns of the publishers, and how much of the RPM can be attributed to effects not directly related to traffic patterns, such as performance requirement changes related to quality thresholds and bid parameters for the content provisioning system 104. These non-traffic related changes can be generally categorized as quality related changes ("traffic-independent changes"). Quality related changes are typically the result of changes in system quality requirements, but also include all changes not due to traffic, e.g., changes in advertiser budgets, page views per user day, external economical conditions, etc.

In some implementations, a traffic composition isolator 114 can monitor changes in the performance metrics that are used to evaluate the content provisioning system 104. When a performance change in a metric is identified, the isolator 114 can consider the quality related changes and traffic related changes experienced by the content provisioning system 104 and identify the basis of the performance change in the metric. If needed, the quality requirements and/or traffic mix parameters of the content provisioning system 104 can be adjusted to address the change in the performance metric.

For example, various quality improvement efforts can be applied to the content provisioning system 104 to improve the performance of the content provisioning system 104. While these quality improvements may actually increase the overall system performance, a change in the traffic mix can also result in a performance decrease that masks the increase gained by quality improvements. Alternatively, the opposite situation may also result in which the quality improvements decrease the overall system performance but the change in the traffic mix results in a performance increase that masks the decrease caused by the quality improvements. The isolator 114 can thus be used to determine whether the change was caused by the quality improvement efforts, or whether the quality improvement efforts did not have a significant impact and/or whether the changes were caused by traffic related changes. In response to these determinations, the isolator 114 can adjust one or more performance requirements, such as rolling back quality changes that decrease system performance, and/or imposing traffic mix requirements if traffic is contributing to a significant performance degradation, to adjust the performance of the system.

In some implementations, traffic components in the system can be attributed on a publisher basis. The isolator 114 can determine the factors that have an effect on the performance metrics by quantifying the effect of any publisher related change (i.e., the amount of traffic change to a publisher) on the performance metric, and the effect of any quality related changes on the performance metric. For example, the isolator 114 can determine the overall change in a performance metric measuring the performance of different publishers during a time period, a reference traffic value for each of the publishers, and a reference traffic change in the performance metric based on the reference traffic values. Using these metrics, the isolator 114 can then determine a traffic related change in the performance metric.

It is axiomatic that changes in the performance of the content provisioning system 104 can be attributed entirely to traffic changes, or entirely to quality changes, or attributed to a mix of traffic and quality changes. While such changes will most often be the result of a mix of traffic and quality changes, these three scenarios are described below to illustrate how the traffic and quality change attributes can be identified in each case.

§3.1 Quantifying the Overall Change in the Performance

Table 1 below illustrates the scenario in which changes are attributed entirely to traffic changes. For example, two publishers, Publishers A and B, can publish various advertisements provided by the content provisioning system 104. The metric of revenue per thousand impressions (RPM) can measure the amount of revenue generated by advertisements provided by content provisioning system 104 for publication on Publishers A and B. Because the content provisioning system 104 serves advertisements for each page view, each page view can be considered an impression.

TABLE 1

Sample Revenue from Content Provisioning System 104

|  |  | Page Views | Revenue USD | RPM |
|---|---|---|---|---|
| Publisher A | Day 1 | 1000 | 1 | 1 |
|  | Day 2 | 2000 | 2 | 1 |
| Publisher B | Day 1 | 1000 | 10 | 10 |
|  | Day 2 | 500 | 5 | 10 |

Table 1 shows the sample revenue generated from the content provisioning system 104 by publisher, by day. The performance of the content provisioning system 104 for each day can be identified by using the aggregate RPM for the content provisioning system 104 for that day. For example, the RPM for Publisher A for Day 1 is 1, because the $1 in revenue was generated for 1000 page views. Similarly, the RPM for Publisher B for Day 1 is 10, because advertisements served by Publisher B generated $10 in revenue for 1000 page views. The RPM for Day 2 for Publisher A and Day 2 for Publisher B are calculated in an identical manner and listed in Table 1 above, respectively $1 and $10.

The isolator 114 first identifies an overall performance change in the performance of the content provisioning system 104. The aggregate RPM for a time period can be determined by calculating the total revenue generated during that day, and dividing it by the number of impressions during that day (where Pub. X is the replaced with Publisher A, and then Publisher B):

$$\text{Day 1 RPM} = \frac{\Sigma(\text{Day 1 RPM for Pub. } X * \text{Day 1 Page Views for Pub. } X)}{\Sigma \text{ Day 1 Page Views}}$$

For example, the RPM and Page Views for Publisher A and Publisher B are used to generate a Day 1 RPM of 5.5, and a Day 2 RPM of 2.8:

$$\text{Day 1 RPM} = \frac{(1*1000)+(10*1000)}{(1000+1000)} = \frac{11000}{2000} = 5.5$$

$$\text{Day 2 RPM} = \frac{(1*2000)+(10*500)}{(2000+500)} = \frac{7000}{2000} = 2.8$$

This aggregate RPM can be calculated for each time period to evaluate the performance of the content provisioning system 104 during that time period. Similarly, the performance for the content provisioning system 104 can be determined for each day by determining the aggregate RPM for that day.

The difference between the aggregate of the performance metric at two different points in the time period identify the performance change of the content provisioning system 104. This performance change can be used to monitor the performance of the content provisioning system 104 over time. For example, the overall change in the performance of the content provisioning system 104 as measured by RPM is the difference between the Day 1 RPM and the Day 2 RPM, as a percentage of the initial RPM:

$$\text{RPM } \Delta = \frac{\text{RPM}_{Day2} - \text{RPM}_{Day1}}{\text{RPM}_{Day1}} = \frac{2.8 - 5.5}{5.5} = -0.491$$

Thus, where the time periods evaluated are the days shown in Table 1, the RPM change from Day 1 to Day 2 was -0.491. This decrease in RPM indicates that the performance of the content provisioning system 104 decreased from Day 1 to Day 2.

§3.2 Determining a Reference Traffic Change in the Performance

The performance change in a performance metric of the content provisioning system 104 over time, such as the performance change determined in Section 3.1, can be due to quality and traffic factors. The change due to quality can be determined by calculating a weighted performance metric for each of the time periods.

A weighted performance metric is determined by using a reference traffic value that is, in some implementations, a constant level of traffic over multiple time periods. The reference traffic value can be a volume of traffic for each publisher that is common to each of the monitored time periods. In some implementations, the minimum value for traffic for a publisher in any of the subject time periods is used as the reference traffic value for that publisher. For example, in Table 1, the minimum traffic value for Publisher A during either Day 1 or Day 2 is 1000 (the number of page views for Publisher A on Day 1 or Day 2, as both values are equal). Similarly, the minimum traffic value for Publisher B during either Day 1 or Day 2 is 500 (the number of page views for Publisher B on Day 2). Accordingly, the reference traffic value for Publisher A is 1000, and the reference traffic value of Publisher B is 500. Although the minimum traffic level is used in this example, other reference traffic volumes can also be used, e.g., maximum traffic level, average traffic level, etc.

The reference traffic value is used to determine a weighted value for the performance metric. In some implementations, the weighted value for the performance metric is calculated by determining the performance metric of the content provisioning system 104 using the constant reference traffic level in place of the actual traffic level:

$$\text{Day 1 Weighted RPM} = \frac{\Sigma(\text{Day 1 RPM for Pub. } X * \text{Ref. Traffic Value for Pub. } X)}{\Sigma \text{ Ref. Traffic Value for Pub. } X}$$

For example, the weighted RPM value for Day 1 is 4.0 and the weighted RPM value for Day 2 is 4.0:

$$\text{Day Weighted 1 RPM} = \frac{(1*1000)+(10*500)}{(1000+500)} = \frac{6000}{1500} = 4.0$$

$$\text{Day Weighted 2 RPM} = \frac{(1*1000)+(10*500)}{(1000+500)} = \frac{6000}{1500} = 4.0$$

The difference between the weighted performance metric values at two points in time during the time period is the reference traffic change. The reference traffic change is the change expected in the performance of the content provisioning system 104 if the traffic remained constant over time. The reference traffic change provides a traffic adjusted value to compare with the overall performance change. For example, where the weighted Day 1 RPM value is 4.0 and the weighted Day 2 RPM value is 4.0, the reference traffic change is 0:

$$\text{Weighted RPM } \Delta = \frac{\text{Weighted RPM}_{Day\,2} - \text{Weighted RPM}_{Day\,1}}{\text{Weighted RPM}_{Day\,1}} = \frac{4.0 - 4.0}{4.0} = 0$$

In this example, there is no difference between the traffic adjusted values of the two time periods, e.g., the weighted RPM. Thus, there is no reference traffic change. Because the reference traffic change is indicative of the change in the performance due to quality, in this example no change in the performance metric is due to the quality of the content. Rather, any change in the performance metric over the time periods is due to traffic.

§3.3 Determining the Traffic and Quality Related Changes

The reference traffic change indicates if there is a quality and/or traffic related change to the performance metric values during the time period. Quality related changes are changes in the performance metric value during the time period that are caused by changes in the quality of the content served by the content provisioning system. The quality related change are changes in the performance metric that are not caused by a change in the traffic to the publishers, or equivalently the quality related change is the same as the reference traffic change. For example, reference traffic change for the content provisioning system 104 is 0, thus the quality related change is also 0.

The reference traffic change also indicates if there is a traffic related change. The overall performance change over time is a product of the traffic related change and the quality related change. Accordingly, the quality related change in the performance metric value is used to determine the traffic related change in the performance metric value during the time period:

$$\frac{\text{Day 2 RPM}}{\text{Day 1 RPM}} =$$

$$(1 + \text{Traffic Related Change}) * (1 + \text{Quality Related Change})$$

Or:

$$\text{Traffic Related Change} = \frac{\text{Day 2 RPM}}{(\text{Day 1 RPM}) * (1 + \text{Quality Related Change})} - 1$$

For example, based on the weighted Day 1 RPM value of 4.0 and the weighted Day 2 RPM value of 4.0, the reference traffic change of 0 indicates that the quality related change from Day 1 to Day 2 was also 0. However, the overall RPM change during that time period was −0.491, as calculated above. Because the overall RPM change is a product of the traffic related changes and the quality related changes, the traffic related changes can be calculated:

$$\text{Traffic Related Change} = \frac{2.8}{(5.5)*(1+0)} - 1 = \frac{2.8}{5.5} - 1 = -0.491$$

The RPM change from Day 1 to Day 2 was −0.491, and the traffic related change was also −0.491. The traffic related change (−0.491) is the same as the overall change, and there is no quality related change. This result is expected because, as Table 1 illustrates, the RPM for both publishers remained the same for both days, and also because the reference traffic change, a measure of performance change if the traffic remained constant, is 0. The only variable that changed is the traffic mix of the publishers.

The sign of the change values indicate the effect that the traffic and quality related factors had on the performance metric. A negative value means that the performance metric was decreased over the time period, while a positive value means the performance was increased over the time period. For example, a traffic related change of −0.491 means that traffic related changes contributed to a 49.1% decrease in the RPM. Thus, in order to improve the performance of the content provisioning system 104, the quality of the content does not need to modified, but the publisher mix can be modified to increase traffic.

§4.0 Example Isolation of Traffic Composition Processes

Figure 2:
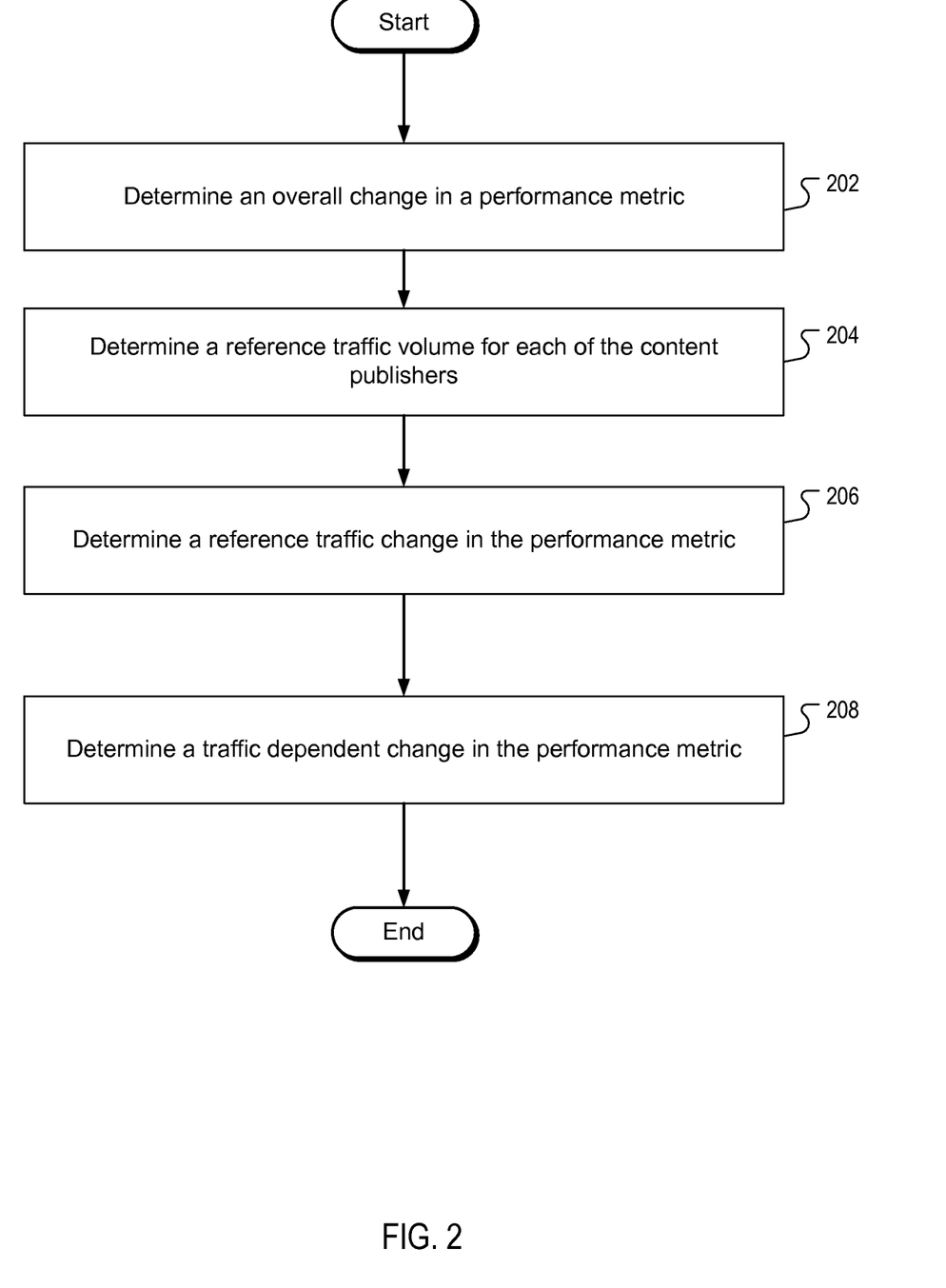
FIG. 2 is a flow diagram of an example process for isolation of traffic composition change.

FIG. 2 is a flow diagram of an example process for isolation of traffic composition change 200. The example process 200 is described in the context of the scenario in which changes are attributed entirely to quality changes. The process 200 can be used in the isolator 114 of FIG. 1, or in some other data processing apparatus that can perform the operations described below.

Stage 202 determines an overall change in a performance metric. The overall change in the performance metric quantifies a change in the performance of a content provisioning from a first time period to a second time period. For example, the isolator 114 can identify a change in the RPM of the content provisioning system 104 from Day 1 to Day 2 based on the data shown in Table 2.

TABLE 2

Sample Revenue from content provisioning system 104

|  |  | Page Views | Revenue USD | RPM |
|---|---|---|---|---|
| Publisher A | Day 1 | 2000 | 4 | 2 |
|  | Day 2 | 2000 | 2 | 1 |
| Publisher B | Day 1 | 1000 | 10 | 10 |
|  | Day 2 | 1000 | 10 | 10 |

The RPM for Publisher A for Day 1 is 2 and the RPM for Publisher B for Day 1 is 1. Thus, the RPM for Day 1 is 4.67:

$$\text{Day 1 RPM} = \frac{(2*2000) + (10*1000)}{(2000 + 1000)} = \frac{14000}{3000} = 4.67$$

The RPM for Day 2 for Publisher A and Day 2 for Publisher B are calculated in an identical manner and listed in Table 2 above, respectively $10 and $10. Thus, the RPM for Day 2 is 4:

$$\text{Day 2 RPM} = \frac{(1*2000) + (10*1000)}{(2000 + 1000)} = \frac{12000}{3000} = 4.0$$

Based on these values, the overall change in the performance metric is 0.67. As a fraction of the whole, the overall change is −0.1429:

$$\text{RPM } \Delta = \frac{\text{RPM}_{Day\,2} - \text{RPM}_{Day\,1}}{\text{RPM}_{Day\,1}} = \frac{4.0 - 4.67}{4.67} = -0.143$$

Stage 204 determines a reference traffic value for each of the content publishers. The reference traffic value is a value that is common to both the first time period and the second time period. For example, the isolator 114 can determine the minimum traffic value for Publisher A during either Day 1 or Day 2 is 2000. Similarly, the minimum traffic value for Publisher B during either Day 1 or Day 2 is 1000.

Stage 206 determines a reference traffic change in the performance metric. The reference traffic change quantifies a traffic-independent change in the performance of the content provisioning system from the first time period to the second time period. The reference traffic change is based on the reference traffic values provided for each of the publishers. For example, the isolator 114 can determine weighted RPM values for each of the time periods:

$$\text{Day Weighted 1 RPM} = \frac{(2*2000) + (10*1000)}{(2000 + 1000)} = \frac{14000}{3000} = 4.67$$

$$\text{Day Weighted 2 RPM} = \frac{(1*2000) + (10*1000)}{(2000 + 1000)} = \frac{12000}{3000} = 4.0$$

The weighted RPM values can be used to determine the reference traffic change.

$$\text{Ref. Traffic}\Delta =$$

$$\frac{\text{Weighted RPM}_{Day\,2} - \text{Weighted RPM}_{Day\,1}}{\text{Weighted RPM}_{Day\,1}} = \frac{4.0 - 4.67}{4.67} = -0.143$$

Stage 208 determines a traffic related change in the performance metric. The traffic related change indicates the effect that changes in traffic had on the performance of the content provisioning system. For example, the isolator 114 can use the reference traffic change to determine the traffic independent change on the performance metric. The reference traffic change for the system 114 is −0.143, thus the quality related change is also −0.143. The traffic related change can be calculated from the overall performance change and the traffic independent change:

$$\text{Traffic Related Change} = \frac{4.0}{(4.67)*(1+-0.143)} - 1 = \frac{4.0}{4.0} - 1 = 0$$

The isolator 114 determines that there is no traffic related change. This means that traffic related factors did not affect the RPM in the time period, but the quality related changes decreased the RPM by 0.143 in the time period. This result is expected because, as Table 2 illustrates, the traffic for both publishers remained the same for both days. The only variable that changed is the RPM of the publishers.

Figure 3:
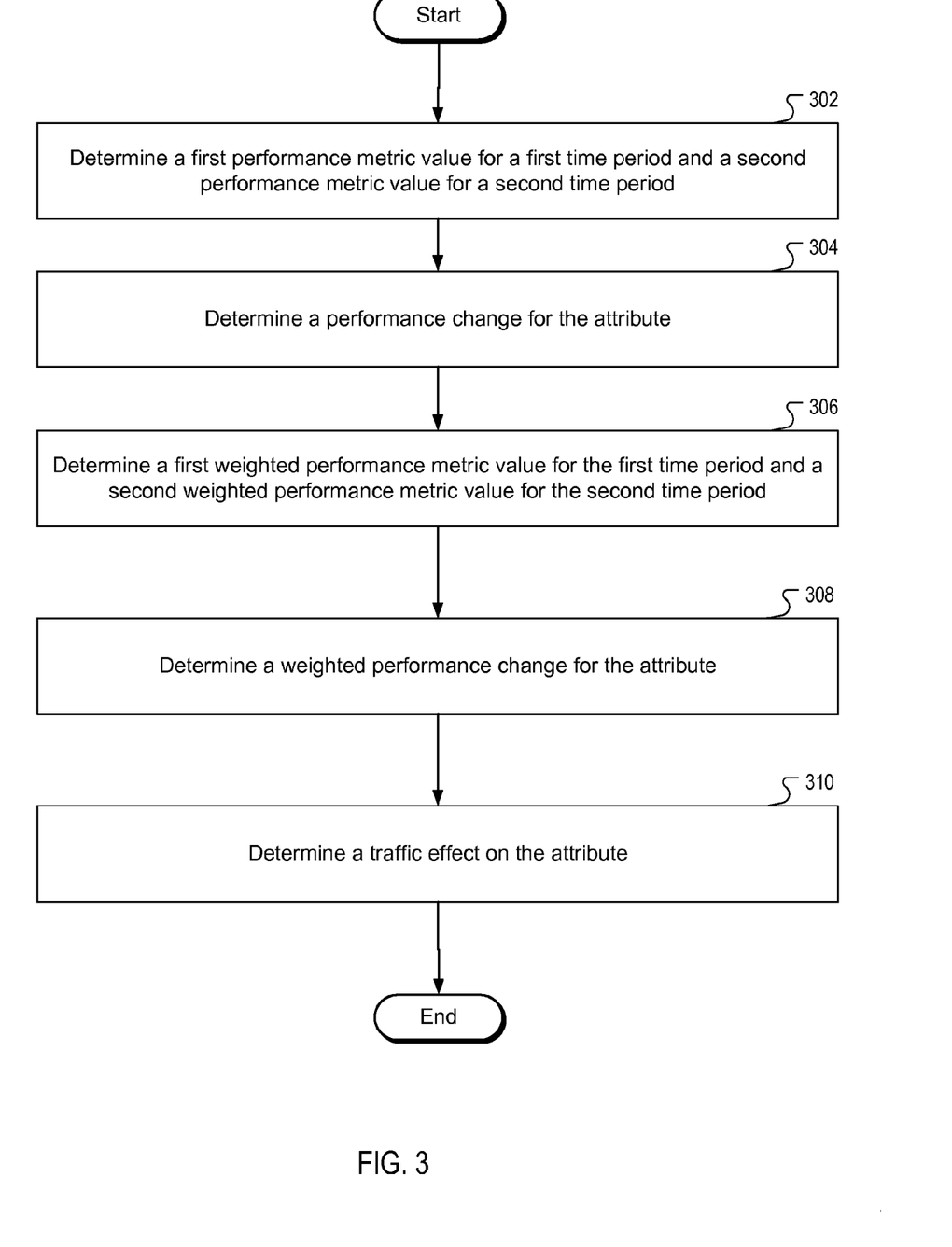
FIG. 3 is a flow diagram of another example process for isolation of traffic composition change.

FIG. 3 is a flow diagram of another example process for isolation of traffic composition change 300. The example process 300 is described in the context of the scenario in which changes are attributed both to traffic and quality changes. The process 300 can be used in the isolator 114 of FIG. 1, or in some other data processing apparatus that can perform the operations described below.

Stage 302 determines a first performance metric value for a first time period and a second performance metric value for a second time period. The first performance metric value can quantify an attribute for the first time period, and the second performance metric value can quantify the attribute for the second time period.

TABLE 3

Sample Revenue from content provisioning system 104

|  |  | Page Views | Revenue USD | RPM |
|---|---|---|---|---|
| Publisher A | Day 1 | 2000 | 4 | 2 |
|  | Day 2 | 2000 | 2 | 1 |
| Publisher B | Day 1 | 1000 | 10 | 10 |
|  | Day 2 | 3000 | 30 | 10 |

For example, the isolator 114 can determine that the first performance metric value for Day 1 as 4.67, and the second performance metric value for Day 2 as 6.4.

$$\text{Day 1 RPM} = \frac{(2*2000) + (10*1000)}{(2000+1000)} = \frac{14000}{3000} = 4.67$$

$$\text{Day 2 RPM} = \frac{(1*2000) + (10*3000)}{(2000+3000)} = \frac{32000}{5000} = 6.4$$

Stage 304 determines a performance change for the attribute. The performance change can be the difference between the first performance metric value and the second performance metric value. For example, the isolator 114 can determine that the performance change in the RPM is 1.73. As a percentage change, the overall change is 0.371:

$$\text{RPM } \Delta = \frac{\text{RPM}_{Day\,2} - \text{RPM}_{Day\,1}}{\text{RPM}_{Day\,1}} = \frac{6.4 - 4.67}{4.67} = 0.371$$

Stage 306 determines a first weighted performance metric value for the first time period and a second weighted performance metric value for the second time period. For example, the first weighted performance metric value for the first time and the second weighted performance metric value for the second time period can be determined by the isolator 114 using the minimum traffic value for each publisher.

$$\text{Day Weighted 1 RPM} = \frac{(2*2000) + (10*1000)}{(2000+1000)} = \frac{14000}{3000} = 4.67$$

$$\text{Day Weighted 2 RPM} = \frac{(1*2000) + (10*1000)}{(2000+1000)} = \frac{12000}{3000} = 4.0$$

Stage 308 determines a weighted performance change for the attribute. The weighted performance change can be the difference between the first weighted performance metric value and the second weighted performance metric value. In some implementations, the weighted performance change can be used as the reference traffic change. For example, the isolator 114 can determine the weighted performance change for the attribute to be −0.143.

$$\text{Weighted }\Delta =$$

$$\frac{\text{Weighted RPM}_{Day\,2} - \text{Weighted RPM}_{Day\,1}}{\text{Weighted RPM}_{Day\,1}} = \frac{4.0 - 4.67}{4.67} = -0.143$$

Stage 310 determines a traffic related change on the attribute. The traffic related change can be determined based on the performance change and the weighted performance change. For example, the isolator 114 can determine the weighted performance change for the system 104 to be −0.143. This weighted performance change also can be the non-traffic related change. The traffic related change can be calculated from the overall performance change and the non-traffic related change:

$$\text{Traffic Related Change} = \frac{6.4}{(4.67)*(1+-0.143)} - 1 = \frac{6.4}{4.0} - 1 = 0.60$$

The traffic related change on the RPM is 0.600. This means that traffic related change increased the RPM in the time period by 0.60, and the non-traffic related change decreased the RPM in the time period by −0.143. For example, the traffic related change and the non traffic related change values both contribute to a change in RPM during the time period, as defined by the following ratio:

$$\frac{\text{Day 2 RPM}}{\text{Day 1 RPM}} =$$

$$(1 + \text{Traffic Related Change}) * (1 + \text{Quality Related Change})$$

By analysis of the magnitude of the values, the relative effect of the traffic and non-traffic factors can be identified. Thus, increasing the RPM of Day 1 by 0.60 to account for the traffic related change would bring the RPM to 7.47. If that value is decreased by 0.143 to account for the non-traffic related change, the Day 2 RPM is 6.40, which was the value of the RPM on Day 2.

While an example performance metric of RPM has been used, other performance metrics can also be used. In some implementations, the performance metric can be a click through rate. For example, a positive traffic related change would indicate that traffic increased the click-through rate, or a negative quality related change would indicate that quality decreased the click-through rate.

While an example sample period of a day has been used, other sample periods can also be used. In some implementations, the performance metrics can be measured over a weekly period. For example, traffic related change would indicate that the performance metric changed from one week to the next.

In some implementations, this method can be used to isolate the effect of each of the different quality factors to the extent that the non-traffic change can be isolated. For example, after the traffic related change was identified in this example as 0.60, this method can be used to determine the effect of the country in which the traffic originates from.

§5.0 Example Computer System

Figure 4:
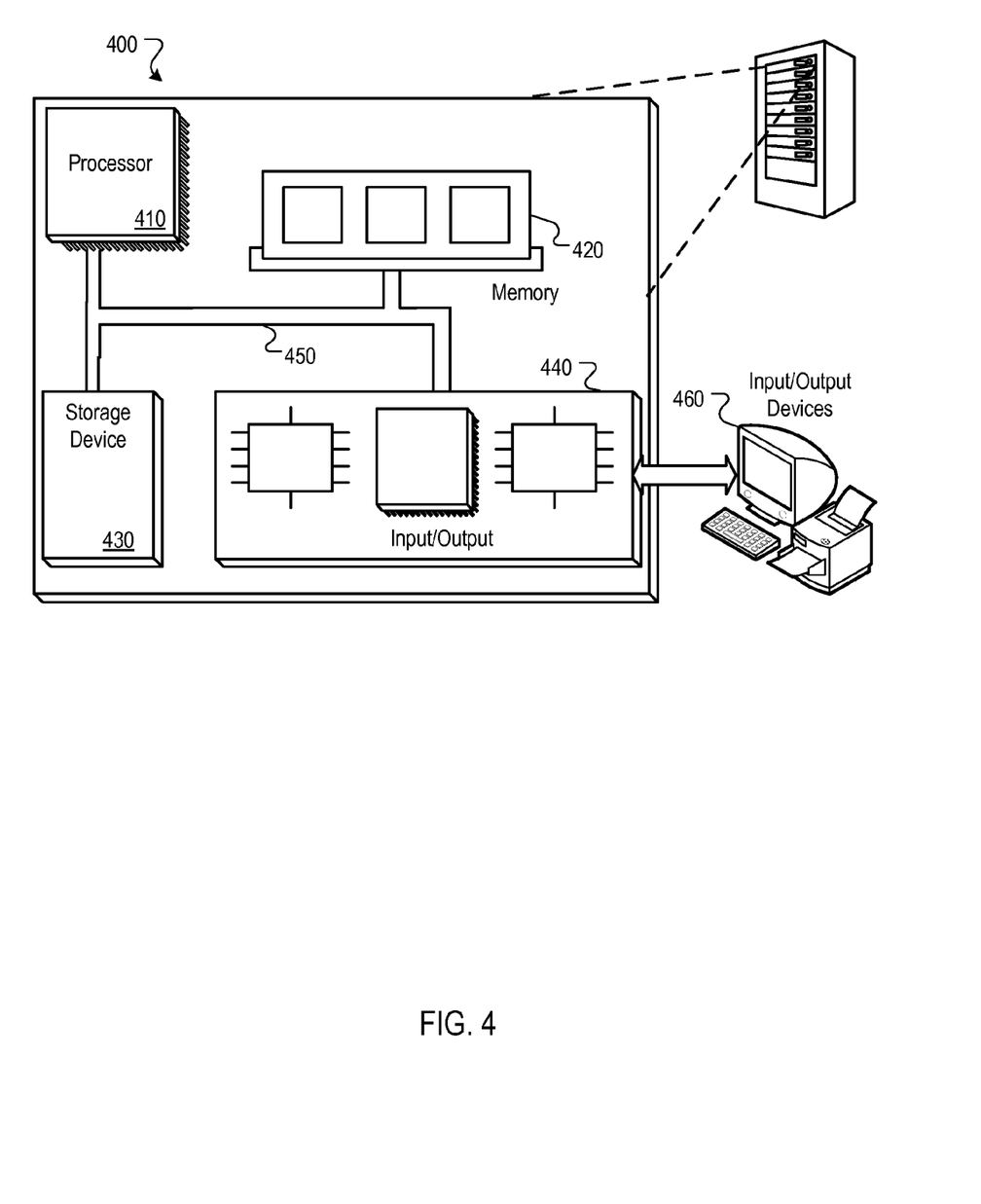
FIG. 4 is block diagram of an example computer system.

FIG. 4 is block diagram of an example computer system 400. The system 400 includes a processor 410, a memory 420, a storage device 430, and an input/output device 440. Each of the components 410, 420, 430, and 440 can, for example, be interconnected using a system bus. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can, for example, include a hard disk device, an optical disk device, or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc. Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine readable storage device, a machine readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
   determining an overall change in a performance metric of a content provisioning system that provides content to a plurality of content publishers, the overall change in the performance metric quantifying a change in an aggregate performance metric for content provided to the content publishers by the content provisioning system over a first time period relative to an aggregate performance metric for content provided to the content publishers by the system over a second time period;
   for each of the content publishers, determining a reference traffic value, wherein the reference traffic value for each publisher is a user traffic volume for the content publisher over each of the first time period and the second time period;
   determining, by the data processing apparatus for the performance metric of the content provisioning system, a reference traffic change over the first time period and the second time period, the reference traffic change being computed as a function of the reference traffic values and performance metric values for content provided to each of the content publishers, the reference traffic change quantifying a traffic-independent change in performance from the first time period to the second time period, the traffic-independent change in performance being a portion of the overall change in the performance metric that is attributable to a minimum traffic volume over one of the first time period and the second time period; and
   determining by the data processing apparatus, a traffic related change in the performance metric of the content provisioning system based on the reference traffic change and the overall change, the traffic related change in performance being a portion of the overall change in the performance metric that is attributable to a change in traffic over the first time period and the second time period.

2. The method of claim 1, wherein determining an overall change in a performance metric of a content provisioning system comprises determining an overall change in a performance metric of an advertisement provisioning system.

3. The method of claim 1, wherein determining an overall change in the performance metric comprises computing an overall change in revenue generated per impression of the content.

4. The method of claim 1, wherein determining an overall change in the performance metric comprises computing an overall change in a click through rate of the content.

5. The method of claim 1, wherein determining a reference traffic value comprises determining a minimum level of traffic for each of the content publishers during the first and second time period.

6. The method of claim 1, wherein the first time period is a first day, and the second time period is a second day.

7. The method of claim 1, further comprising adjusting a quality requirement for content provided by the content provisioning system in response to a determination that the reference traffic change is indicative of a performance degradation in content provided by the content provisioning system.

8. The method of claim 1, wherein determining a reference traffic change comprises:
   computing first weighted performance value for the content provisioning system, wherein the first weighted performance value is a ratio of a weighted sum of performance metric values for content provided to each of the content publishers during the first time period, and wherein the performance metric value corresponding to each content publisher is weighted by the reference traffic value for the publisher;
   computing a second weighted performance value for the content provisioning system, wherein the second weighted performance value is a ratio of a weighted sum of performance metric values for content provided to each of the content publishers during the second time period, and wherein the performance metric value corresponding to each content publisher is weighted by the reference traffic value for the publisher;

computing a first ratio of the first weighted performance value and a sum of the reference traffic values for the content publishers;

computing a second ratio of the second weighted performance value and the sum of the reference traffic values for the content publishers; and computing, as the reference traffic change, a mathematical difference between the first ratio and the second ratio.

9. A method for identifying an effect of traffic changes on performance metrics, comprising:

determining, by a data processing apparatus, a first performance metric value for a first time period, the first performance metric value quantifying an attribute for content provided by a content provisioning system during the first time period;

determining, by a data processing apparatus, a second performance metric value for a second time period, the second performance metric value quantifying the attribute for content provided by a content provisioning system during the second time period;

determining, by a data processing apparatus, a performance change for the attribute based on a mathematical difference between the first performance metric value and the second performance metric value;

determining, by a data processing apparatus, a first weighted performance metric value for content provided by the content provisioning system during the first time period;

determining, by a data processing apparatus, a second weighted performance metric value for content provided by the content provisioning system during the second time period;

determining, by a data processing apparatus, a weighted performance change for the attribute based on a mathematical difference between the first weighted performance metric value and the second weighted performance metric value, the weighted performance change being a portion of overall performance change that is attributable to a minimum user traffic volume that is experienced over one of the first time period and the second time period; and determining, by a data processing apparatus, a traffic related change on the attribute based on the performance change and the weighted performance change.

10. The method of claim 9, wherein the first and second performance metric values include data from two or more publishers.

11. The method of claim 10, further comprising determining a reference traffic value for each of the two or more publishers, wherein the reference traffic value for each publisher is a user traffic volume for the publisher over each of the first time period and the second time period.

12. The method of claim 11, wherein the reference traffic value for each publisher is a minimum traffic value for each publisher from the first or second time period.

13. The method of claim 11, wherein determining a first weighted performance metric value comprises determining a first value quantifying the attribute for the first time period at the reference traffic value.

14. The method of claim 11, wherein determining a second weighted performance metric value comprises determining a second value quantifying the attribute for the second time period at the reference traffic value.

15. The method of claim 9, wherein the attribute measures performance of advertisements provided to content publishers by the content provisioning system during time periods.

16. The method of claim 15, wherein the attribute is revenue generated from the advertisements.

17. The method of claim 15, wherein the attribute is click-through rates of the advertisements.

18. The method of claim 15, further comprising determining whether quality of the advertisements has changed based on the weighted performance change.

19. Software stored in a memory device and comprising instructions executable by a data processing system and upon such execution cause the data processing system to perform operations comprising:

determining an overall change in a performance metric of a content provisioning system that provides content to a plurality of content publishers, the overall change in the performance metric quantifying a change in an aggregate performance metric for content provided to the content publishers by the content provisioning system over a first time period to a second time period;

for each of the content publishers, determining a reference traffic value, wherein the reference traffic value for each publisher is a user traffic volume for the content publisher over each of the first time period and the second time period; and determining, for the performance metric of the content provisioning system, a quality related change and a traffic related change based on the reference traffic values, the quality related changes being computed as a function of the reference traffic values and performance metric values for each of the content publishers, the quality related changes being a portion of the overall change that is attributable to a minimum user traffic volume that is experienced over one of the first time period and the second time period, the traffic related change being a portion of the overall change in the performance metric that is attributable to a change in traffic between the first time period and the second time period.

20. The software of claim 19, further comprising instructions executable by the data processing system and upon such execution cause the data processing system to perform operations comprising:

adjusting one or more quality requirements for content provided by the content provisioning system in response to determining that quality related changes are indicative of performance degradation.

21. A method performed by a data processing apparatus, the method comprising:

determining a change in a performance metric of a content provisioning system that provides content to a plurality of content publishers, the change in the performance metric quantifying an aggregate change in the performance metric for content provided to the content publishers by the content provisioning system over a first time period relative to an aggregate performance metric for content provided to the content publishers by the system over a second time period;

for each of the content publishers, determining a reference traffic value, wherein the reference traffic value for each publisher is a user traffic volume for the publisher over each of the first time period and the second time period; and determining by the data processing apparatus, for the performance metric of the content provisioning system, a traffic-independent change in the performance metric over the first time period and the second time period, the traffic-independent change being a portion of the change in the performance metric that is attributable to a minimum traffic volume for one of the first time period and the second time period, the traffic-independent change being computed as a function of the reference traffic values for the publishers and the performance metric values for content provided to each of the content publishers.

22. A method performed by a data processing apparatus, the method comprising:

determining a change in a performance measure for a content distribution system, the change in the performance measure being based on a first performance measure for content provided over a first time period and a second performance measure for content provided over a second time period;

determining user traffic volume for each of the first time period and the second time period;

determining, by the data processing apparatus, a traffic-dependent change that quantifies a portion of the change in the performance measure that is attributed to a change in the user traffic volume from the first time period to the second time period; and determining, by the data processing apparatus, a traffic-independent change that quantifies a portion of the change in the performance measure that is attributed to a minimum user traffic volume among the first time period and the second time period.

* * * * *